Figure 1:
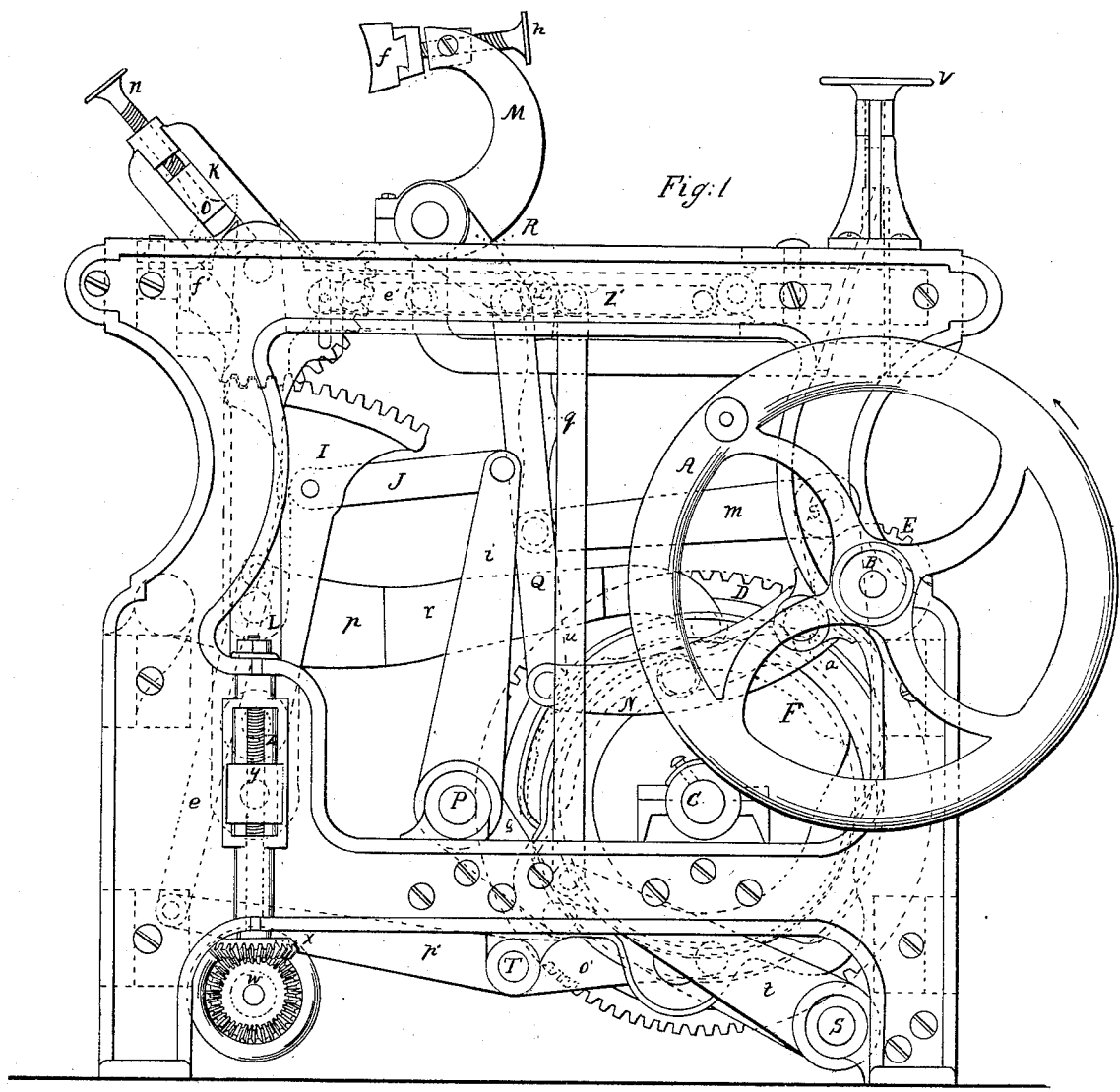

J. E. Coffin.
Mach. for Curving Backs of Books.
No. 55,468. Patented Jun. 12, 1866.

Witnesses
William H. Clifford.
Hanno N. Gage.

Inventor
John E. Coffin

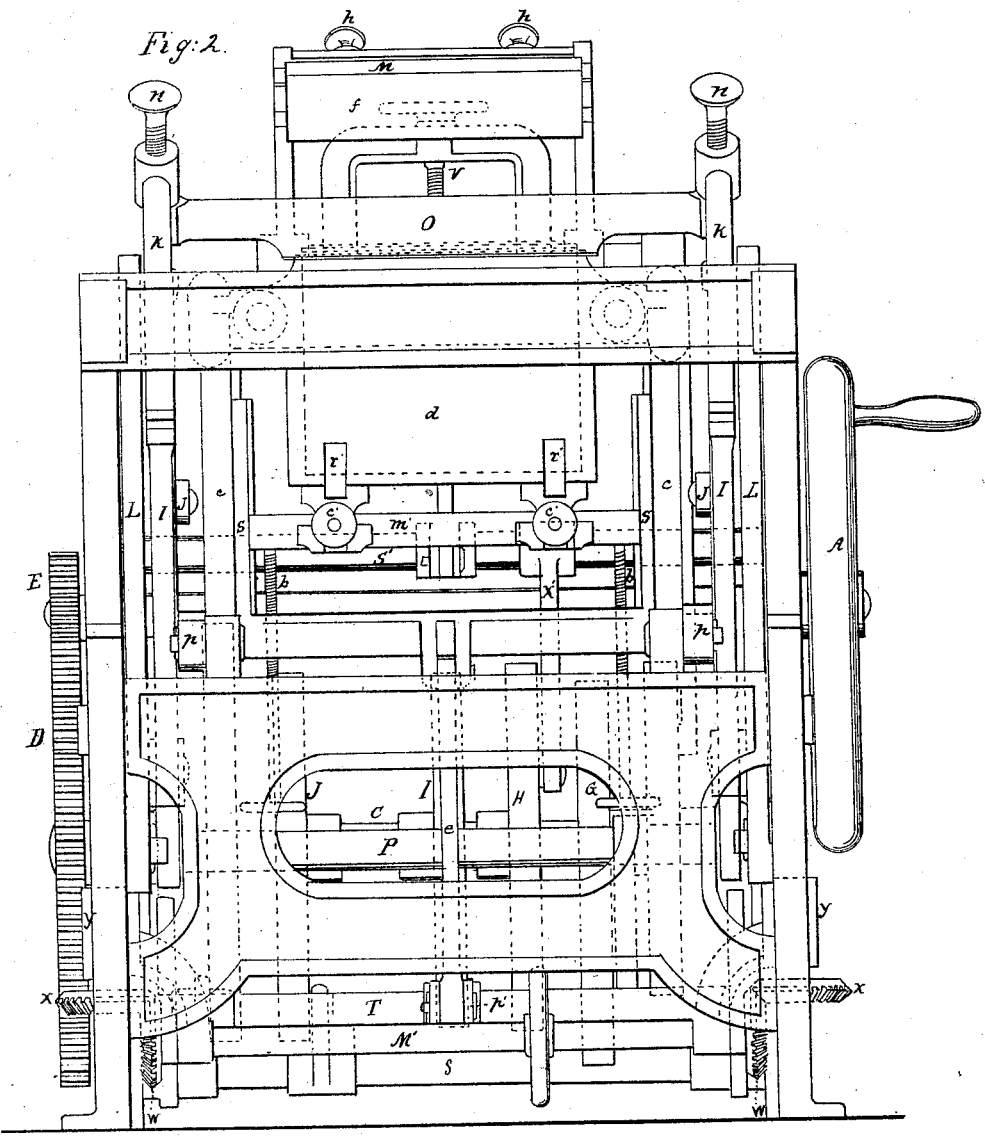

J. E. Coffin. Sheet 3. 5 Sheets.
Mach. for Curving Backs of Books.
Nº 55,468. Patented Jun. 12, 1866.
Fig: 3
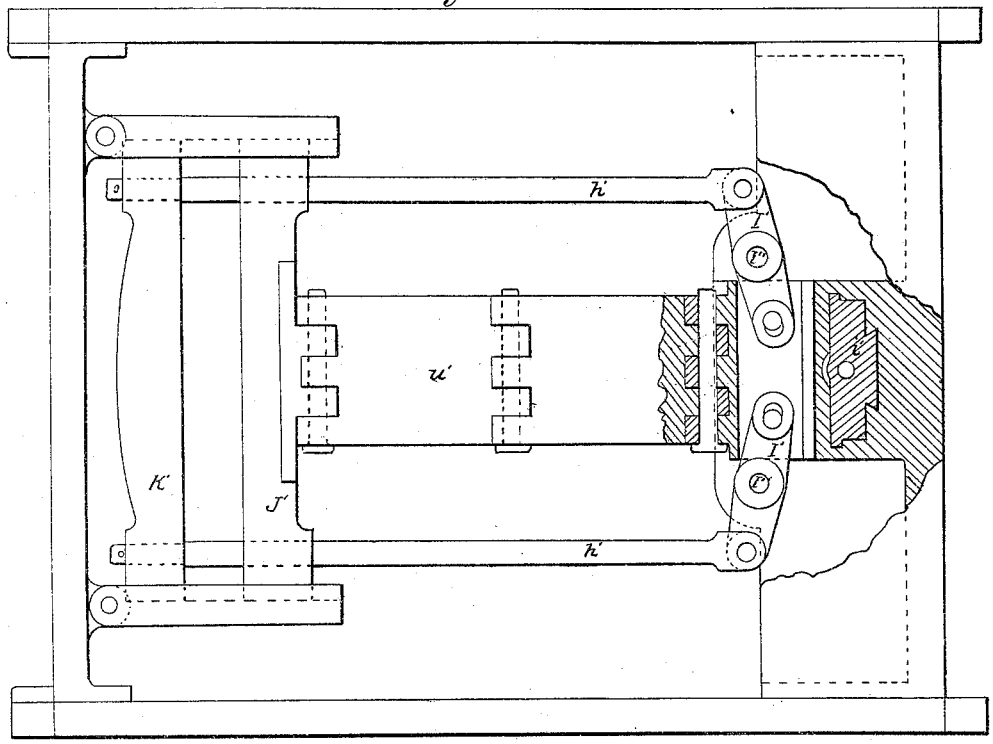
Fig: 4
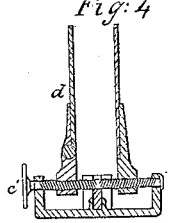
Witnesses
William H Clifford
Harri W Gage
Inventor
John E. Coffin

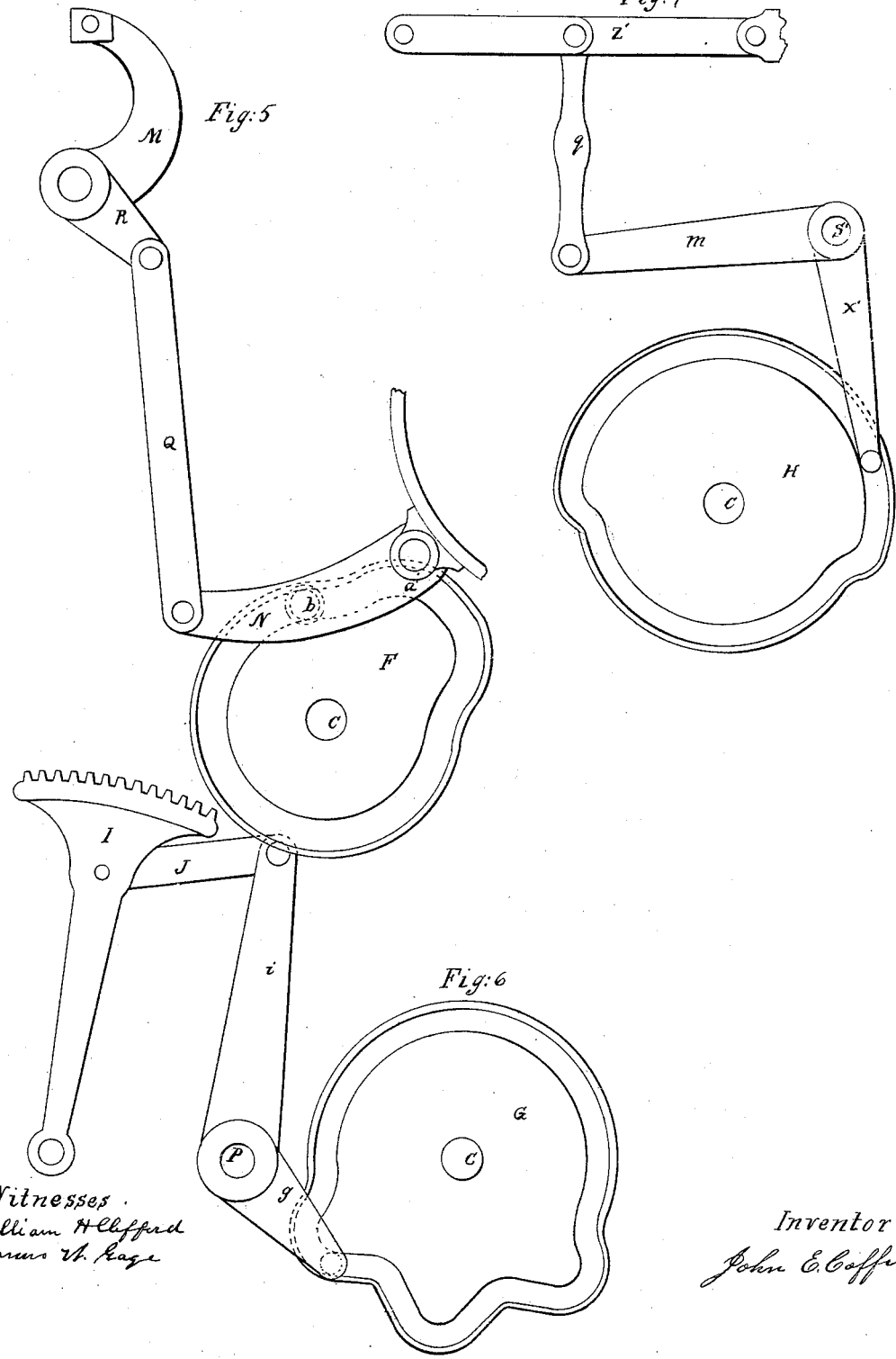

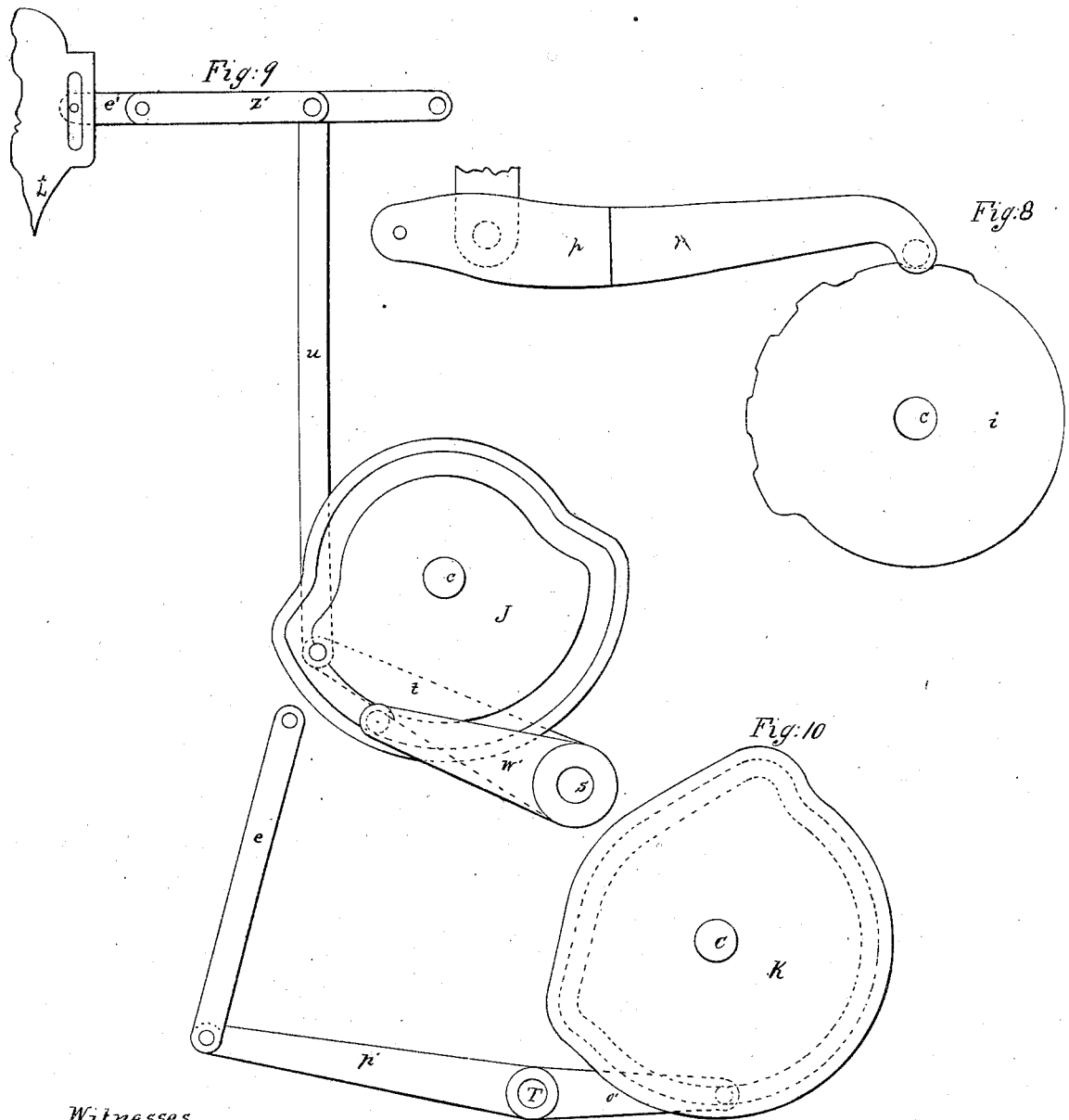

UNITED STATES PATENT OFFICE.

JOHN E. COFFIN, OF PORTLAND, MAINE.

MACHINE FOR CURVING THE BACKS OF BOOKS.

Specification forming part of Letters Patent No. 55,468, dated June 12, 1866.

*To all whom it may concern:*

Be it known that I, JOHN E. COFFIN, of Portland, in the county of Cumberland and State of Maine, have invented a new and Improved Machine for Curving the Backs of Books; and I hereby declare the following to be a full, clear, and exact description of the same, reference being made to the accompanying drawings, making part of this specification, in which—

Figure 1, Sheet No. 1, represents a side elevation of my machine; Fig. 2, Sheet No. 2, an end elevation; Fig. 3, Sheet No. 3, a plan of the device for opening and closing the jaws; Fig. 4, Sheet No. 3, a section of the book-holder; Fig. 5, Sheet No. 4, a section operated by the cam F; Fig. 6, Sheet No. 4, a section operated by the cam G; Fig. 7, Sheet No. 4, a section operated by the cam H; Fig. 8, Sheet No. 5, a section operated by the cam I; Fig. 9, Sheet No. 5, a section operated by the cam J; Fig. 10, Sheet No. 5, a section operated by the cam K.

The same letters indicate like portions of the machine in all the sheets and figures.

My invention consists in the employment of adjustable clamping-jaws, a regulator, a sliding book-frame, and an adjustable pressure-bar, operated by the means and in the order hereinafter described; also, in the arrangement of six cams upon the same axis of revolution, for the purpose of making the machine automatic in its operations.

The motion to my machine is imparted by the motive wheel A, which revolves upon the shaft B. This is communicated to the main shaft C by means of the cog-wheels D and E. Upon the main shaft C are set six cams, from which the varied operations of the machine are derived. The cams are shown at F, G, and H, Figs. 5, 6, and 7, Sheet No. 4, and I, J, and K, Figs. 8, 9, and 10, Sheet No. 5.

The cam F imparts motion to the regulator M, Sheets Nos. 1 and 2. This is effected by means of the lever N, which is attached to the frame of the machine at the pivot $a$. The link Q then connects N with the lever R, secured to the axis of the regulator. The office of the regulator is to regulate the projection of the book through the jaws and give the desired curve to the backs. It is provided with a mold, $f$, Sheets Nos. 1 and 2, which can be removed on a slide, in order to substitute another of different size and curvature in its place. The mold is secured to the regulator by the screws $h$ $h$, by which, when it is turned over the jaws, the space between the mold and the jaws can be increased or diminished.

The cam G moves the pressure-bar O, Sheets 1 and 2. This is accomplished by the lever $g$, affixed to the shaft P, by which the shaft is turned. To this shaft are then attached the levers $i$ $i$, moving the geared segment-levers I I by the link J. The gearing of the segment-levers I I works into the gearing of the levers K K, into which the pressure-bar is fitted in a slot constructed for the purpose, and rendered adjustable by means of the screws $n$ $n$. Both the levers I I and K K turn upon pivots or fulcrums set in the upright supports L. The supports L L are employed to increase or diminish the arc of revolution described by the pressure-bar and its distance above the jaws. These supports rest on pivots set into the inner side of the sliding boxes $y$ $y$, which are raised and depressed by the screws $z$ $z$. The screws are turned by the cog-wheels $x$ $x$, which are acted upon by the wheels $w$ $w$, set on the ends of the shaft M′, Sheet No. 2. Upon the shaft is set the truck $o$ for convenience of manipulation. It will thus be seen that by turning the truck $o$ the sliding boxes $y$ $y$ can be raised or lowered, carrying with them the upright support L L, attached to them, and the segment-levers I I and K K, secured to the supports L L.

The cam H, Figs. 1, 2, and 7, rocks the shaft S′ with the lever $x'$. To this shaft is secured the lever $m$. This is connected with the toggle $u'$ by the link $q$. By means of this combination the revolution of the shaft bends or straightens the toggle, which opens or closes the jaws.

The surface-cam I raises and lowers the frame $p$ $p$ by means of the lever $r$, resting on its circumference. Into the frame $p$ $p$ are set the upright posts $c$ $c$, fitted with tracks, on which moves the sliding frame $s$ $s$, on which the book is placed. The jaws rest upon the posts $c$ $c$, so that by the revolution of the cam I the jaws are raised with the frame, and this happens at the same time the pressure-bar O is moved to its place over the center. The strain caused by the pressure-bar is thus thrown not on the comparatively slender frame $s\ s$, but on the strong upright supports resting in the frame $p\ p$.

The cam J withdraws the pressure-bar from over the center of the jaws, in order to allow the operations of the regulator. This is effected by the lever $w'$ turning the shaft S; then the levers $t\ t$, attached to the shaft, and the links $u\ u$ connect with the toggle $z'$. Thus by crooking the toggle $z'$ the supports L turn slightly on their pivots on the inner side of the sliding boxes $y$, and with them the geared segment-levers K K, which hold the pressure-bar, are swung back toward the regulator. To the toggle $z'$ is connected the sliding link $e'$, working in a groove on the inner side of the frame of the machine, so that the supports L and the levers K, when the pressure-bar is over the center of the jaws, are withdrawn by the link $e'$ working horizontally, and, when returned by the aid of the shoulders $f'$ of the supports L and recesses constructed for their reception, are held rigidly in their position.

The cam K produces the rising and falling of the sliding book-frame $s\ s$ before referred to. This is done in the following manner: The lever $o'$ rocks the shaft T. Secured to the shaft is the lever $p'$, which, by the link $c$, communicates the motion of the shaft to the sliding frame. The bar $m'$ of the sliding frame is moved by the screws $b\ b$ upward or downward to accommodate the holder to the different widths of books.

In all the cams the primary levers are furnished with rollers working in the paths of the cams, except the cam I, which, as before observed, has the lever resting on its periphery.

As before observed, the motions of the machine are derived from the cams, which are rigidly affixed to the main shaft C. From this it is apparent that by their arrangement on the shaft and the relative positions of the irregularities of their forms are imparted the regular and successive operations of the various parts of the machine.

The several movements of the machine are as follows: When the motive wheel A is so turned that the regulator shall be thrown back at its farthest inclination from the jaws, as represented in Sheet 1, and the pressure-bar at its farthest inclination toward the axis of the regulator, then, by the revolution of the motive wheel, the book-frame rises to its position under the jaws, the regulator turns and adjusts the projection of the book through the jaws and gives the desired curve to the book-back. The jaws then close on the book so thrust between them. The jaws then rise under the pressure-bar, and the pressure-bar performs its part in the work of the machine. The rising of the book-frame and the descent of the regulator are simultaneous, as are also the rising of the jaws and the motions of the pressure-bar.

At V, Sheet No. 1, is represented a thumb-screw working an inclined plane, which can be raised and lowered by turning the screw. By this device the space between the jaws can be widened or narrowed at will with the aid of the toggle $u'$ and the rods $h'\ h'$, while the center of the jaws always remains at the same point under the pressure-bar. A plan of this method of operation is seen at Fig. 3, Sheet No. 3, of the accompanying drawings.

Whenever the inclined plane is raised so as to slide the jaw $J'$ toward the jaw $K'$ the same motion will, by means of the levers $I'\ I'$, having fixed fulcrum-pivots at $I''\ I''$, and the rods $h'\ h'$, bring the jaw $K'$ toward the jaw $J'$ to the same extent. The jaws are set in horizontal grooves attached to the heads of the posts $c\ c$, which, as before mentioned, receive the same motion as the frame $p\ p$.

Upon the bar $m'$ of the sliding frame $s\ s$ is constructed the clasp-holder $d$, Sheet No. 2, and in section at Fig. 4, Sheet No. 3, to hold the book while being subjected to the operations before described of the machine. This is secured to the bar $m'$ by the screws $c'\ c'$, and is so constructed that when the frame is lowered the outer leaf can be turned outward and downward and the book introduced. When the backing is complete the book is removed through the upper side of the jaws. Both the pressure-bar and the regulator being then turned away from over the jaws, and also the jaws dropping and the book-frame rising slightly, the book is thrust farther through the jaws so that it can be easily grasped by the hand.

I do not claim the combination of the screw V, the toggle $u'$, the levers $I'\ I'$, and rods $h'\ h'$, for these are a subject of previous Letters Patent to myself; but What I do claim, and desire to secure by Letters Patent, is—

1. The combination and arrangement of the cams F, G, H, I, J, and K on the main shaft C, in the manner and for the purposes before described.

2. The combination of the shaft $M'$, the truck $o$, the cog-wheels $w$ and $x$, the screws $z$, the sliding boxes $y$, the posts L, the segment-levers K, and the adjustable pressure-bar O, as and for the purpose described.

3. The combination of the cam F, lever N, link Q, lever R, regulator M $h$, and sliding mold $f$, as and for the purposes described.

4. The combination of the cam G, lever $g$, shaft P, levers $i$, links J, segment-levers I and segment-levers K, and the pressure-bar O, as and for the purpose described.

5. The combination of the cam I, lever $r$, frame $p\ p$, supports $c\ c$, and sliding frame $s\ s$, for the purpose of raising the jaws under the pressure-bar and pushing the book through the jaws so it can be easily removed.

6. The combination of the cam J, shaft S, levers $t\ t$, links $u\ u$, toggles $z'\ z'$, links $e'\ e'$, and posts L L, as and for the purpose described.

7. The combination of the cam K, lever $o'$, shaft T, lever $p'$, link $e$, frame $p\ p$, sliding frame $s\ s$, screws $b\ b$, and bar $m'$, for the purpose of adjusting the position of the book and presenting it to the operations of the pressure-bar.

8. The combined use and arrangement of a solid adjustable pressure-bar, O, with the jaws which rise under the bar when the bar is in operation.

9. The use of the clasp-holder $d$, the screws $c'\ c'$, and the hinges or joints $r'\ r'$, as and for the purpose specified.

JOHN E. COFFIN.

Witnesses:
 WILLIAM H. CLIFFORD,
 HANNO W. GAY.